Patented Apr. 10, 1923.

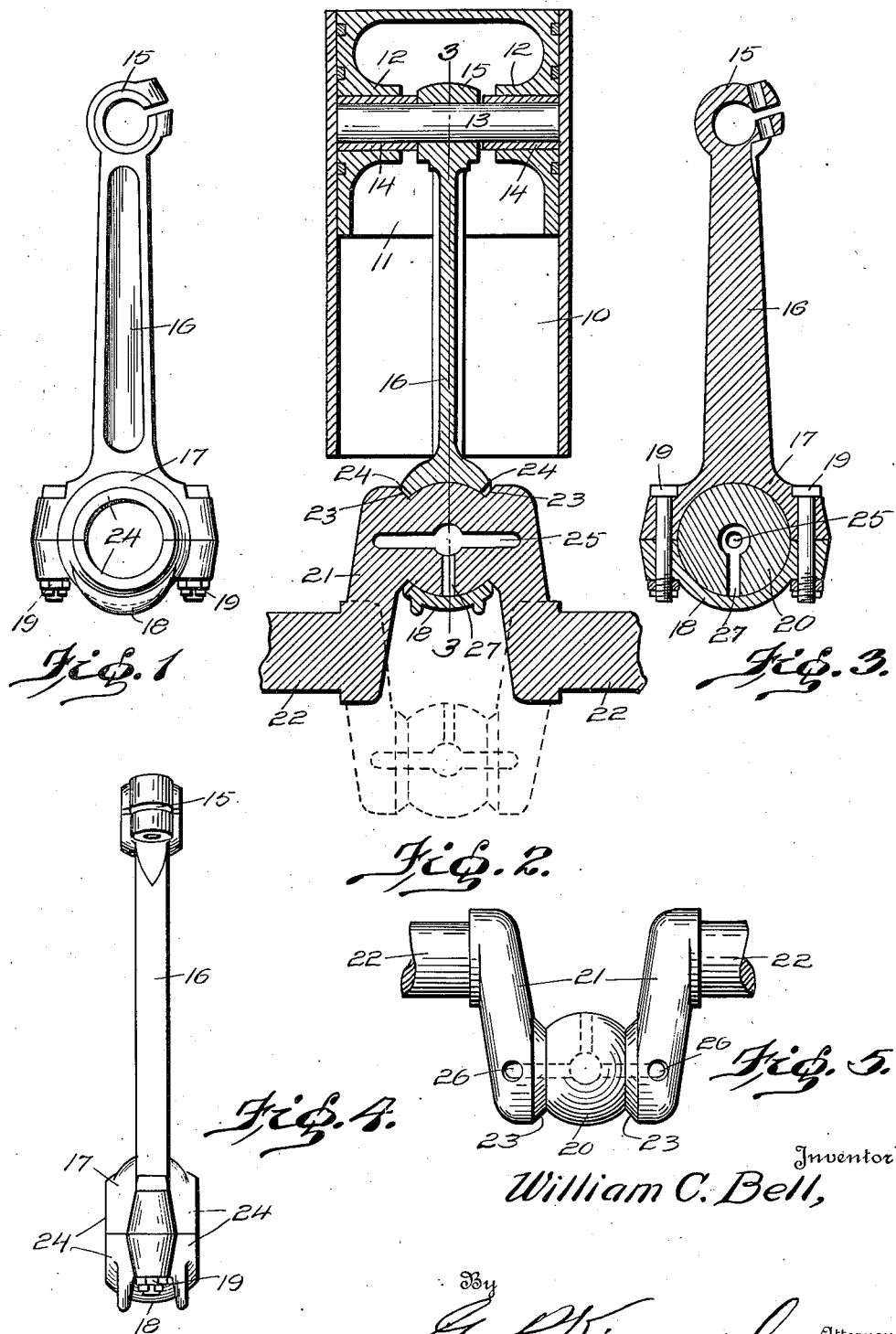

1,451,608

UNITED STATES PATENT OFFICE.

WILLIAM CRAWFORD BELL, OF BALTIMORE, MARYLAND.

CRANK-SHAFT AND CONNECTING-ROD BEARING.

Application filed May 17, 1922. Serial No. 561,757.

*To all whom it may concern:*

Be it known that I, WILLIAM CRAWFORD BELL, a subject of the King of Great Britain, residing at Baltimore city, in the State of Maryland, have invented certain new and useful Improvements in Crank-Shaft and Connecting-Rod Bearings, of which the following is a specification.

This invention appertains to certain improvements in connecting rod bearings for the crank shafts of internal combustion engines and the like, and has for its principal object to provide for a novel form of such bearings whereby to relieve the connecting rod from any and all tendency toward lateral, oscillating, or swaying movements thereon during successive strokes of the pistons of an engine and the consequent and successive revolutions of the crank shaft thereof.

Another object of the invention is to provide for a bearing of the class mentioned, and one of a refined mechanical construction and arrangement capable of operating efficiently for its intended purposes, and otherwise to eliminate all undue noises and sounds by preventing the lateral play of the connecting rod as aforesaid.

A further object of the invention is to provide for a bearing of the type as hereinbefore characterized, and one embodying a novel means of self-lubrication whereby the usual wear and tear thereon is reduced to an absolute minimum, and the life and general efficiency of the general operation of the engine is correspondingly increased.

With the foregoing and other equally important objects in view, the invention resides in the certain novel and useful construction and arrangement of parts as will be hereinafter more fully described, set forth in the appended claims, and illustrated in the accompanying drawing, in which:—

Figure 1 is a side elevation of a connecting rod embodying the improved form of bearing sockets thereon, Fig. 2 is a vertical fragmentary section through one cylinder and piston unit of an internal combustion engine, and showing the preferred embodiment of the bearing connection between the connecting rod and crank shaft thereof, Fig. 3 is a vertical section taken on the line 3—3 of Fig. 2, Fig. 4 is a view of the connecting rod shown in Fig. 1, and as it appears in elevation, and, Fig. 5 is a fragmentary detail in elevation of the improved form of bearing portion of a crank section of an engine shaft.

Referring to the drawing, wherein similar characters of reference designate corresponding parts throughout the several views thereof, the numeral 10 indicates an engine cylinder having a piston 11 mounted therein for usual reciprocating movements. The piston 11 is provided with the usual forms of inwardly disposed bearing bosses 12 arranged in alinement one with the other diametrically thereof for the journaling within the same of the opposite ends of a piston pin 13. Surrounding the opposite ends of the piston pin 13 are a pair of bushings or sleeves 14, which are preferably positioned within the bosses 12 with their inner ends bearing against the opposite sides of the split head portion 15 of a connecting rod 16 clamped around the medial portion of the piston pin 13 as in the ordinary manner thereof.

The lower end of the connecting rod 16 is formed to provide a two part substantially spherical bearing socket, one part 17 thereof being integrally formed with the connecting rod and the other part 18 separable therefrom, but normally secured in position thereto by means of machine bolts or the like 19, passing through complementally formed pairs of ears 17' and 18', formed on the bearing parts 17 and 18, respectively, when engaged around a spherical journalled portion 20 formed medially of the crank portion 21 of an engine shaft 22. The journal 20 of the crank portion 21 of the engine shaft, has the same form of the spherical socket of the connecting rod, except that it will extend slightly beyond the opposite sides or ends of the bearing sockets, where its extremities will merge into oppositely disposed substantially conical shoulders 23. The surfaces of these shoulders 23 will coincide with any straight line passing through the center of the spherical journal 20 and touching any point of junction between the journal 20 and the shoulders 23. Similarly, the opposite edges or ends of the spherical socket, formed by the parts 17 and 18, are provided with complementally arranged conical surfaces 24 and the same will coincide with any straight line passing through the common center of the spherical journal and the socket, and touching any point at the opposite extremities of the latter.

Formed interiorly of the spherical journal 20, and on the longitudinal center thereof, is a cavity or duct 25, which connects at its opposite ends two canals or ducts 26 opening outwardly of the opposite arms, forming the crank portion 21 of the engine shaft 22, to receive therethrough a supply of oil from the body of oil usually placed within the crank case of an engine for the purpose of being splashed onto all interior moving parts of the latter by the turning movements of the crank portions 21 of the shaft 22. Formed radially of the spherical journal 20 is a canal or duct 27 connecting the cavity or duct 25 at the center thereof whereby oil is led therefrom to the bearing surfaces of the socket and journal.

From the foregoing, it will be readily apparent that, as all points on the bearing surfaces of the connecting rod socket and spherical journal are equidistantly spaced from a common center, the latter is free to vacillate or wobble within the socket in a manner to compensate for any discrepancy or inaccuracy of alinement of the engine shaft 22, and to the extent permitted by the spaces between the conical shoulders 23 and the complemental conical surfaces of the socket, while the said shoulders 23 and the opposed socket surfaces 24 act to nullify, without injury to the engine shaft 22 or the socket bearing of the connecting rod 16, any tendency of the piston 11 to turn within the cylinder 10.

The installation of this form of spherical connecting rod bearing on the crank shaft of an internal combustion engine will permit of the two piston bearing bushings or sleeves 14 to be adjusted in contact with the opposite sides or ends of the connecting rod head 15, in lieu of the present mounting of the same allowing for spaces therebetween, whereby the connecting rod 16 is centered in the piston and cylinder at all times. It is to be noted that the spherical journal 20 and the socket formed by the bearing parts 17 and 18, will be formed of steel, while the latter parts, together with the conical surfaces 24 thereof, will be lined with a suitable bearing metal (not shown).

It is also to be noted that the lubricating canals or ducts 26 are preferably arranged on the right hand side of the crank portion 21 of the engine shaft 22, in order that the centrifugal action of the latter in its turning movements will effect a dipping up of oil from the crank case and force the same inwardly of the canals or ducts 26 and into the cavity or duct 25 at the center of the journal 20, from whence, the shock caused by the explosion of gas above the piston within the cylinder, being transmitted through the connecting rod 16 to the lower half or separable part 18 on the spherical socket, will pump or suck oil directly into the connecting rod bearing surrounding the journal 20.

It is well understood that, while a preferred embodiment of the bearing has been described and illustrated herein in specific terms and details of construction and arrangement, various changes in and modifications of the same may be resorted to without departing from the spirit of the invention, or the scope of the claims appended hereto.

Having thus described the invention, what is claimed as new, is:—

1. In combination an engine shaft having a pair of cranks each formed with an inwardly extending conical portion, a journal portion spherical throughout and integral with said conical portions, a connecting rod formed with a spherical bearing socket and engaging said journal portion, the area of the bearing surface of said socket being less in cross section than the area of the journal portion in longitudinal section to compensate for any inaccuracies in the alignment of the journal with respect to the socket, said bearing socket provided at each end with a conical bearing surface cooperating with the conical portions of the cranks for limiting the said compensating effects.

2. In combination an engine shaft provided with a pair of cranks, each of said cranks formed on its inner face at its outer end with an inwardly extending conical portion, said conical portions oppositely disposed with respect to each other, a journal portion spherical throughout, integral with and of a diameter greater than said conical portions, a connecting rod provided at one end with means to provide a two part spherical socket mounted on said journal, and said means provided at each end with a conical bearing surface, said conical bearing surface opposing said conical portions.

3. In combination an engine shaft provided with a pair of cranks each formed with a conical bearing, a journal portion spherical throughout and integral with said conical bearings, and a connecting rod provided at one end with means to provide a sectional bearing socket spherical throughout and mounted on said spherical journal, said means provided with conical bearings opposing the conical bearings on the cranks.

In testimony whereof, I affix my signature hereto.

WILLIAM CRAWFORD BELL.